United States Patent [19]

Ko

[11] Patent Number: 6,128,675
[45] Date of Patent: Oct. 3, 2000

[54] MEMORY DEVICE HAVING PLURALITY OF FLASH MEMORIES WITH A FLASH MEMORY CONTROLLING CIRCUIT

[75] Inventor: Young-Hoon Ko, Seoul, Rep. of Korea

[73] Assignee: SamSung Electronics Co., Ltd., Suwon, Rep. of Korea

[21] Appl. No.: 09/058,353

[22] Filed: Apr. 10, 1998

[30] Foreign Application Priority Data

Apr. 10, 1997 [KR] Rep. of Korea ................... 97-13196

[51] Int. Cl.7 ........................... G06F 13/00; G06F 12/00
[52] U.S. Cl. ................... 710/23; 710/9; 710/20; 710/23; 711/103
[58] Field of Search ......................... 710/22, 23, 9, 710/26; 711/103, 112; 365/200, 201, 185.33, 218; 395/431

[56] References Cited

U.S. PATENT DOCUMENTS

| | | |
|---|---|---|
| 4,979,171 | 12/1990 | Ashley . |
| 5,046,086 | 9/1991 | Bergen et al. . |
| 5,191,556 | 3/1993 | Radjy . |
| 5,199,033 | 3/1993 | McGeoch et al. . |
| 5,280,454 | 1/1994 | Tanaka et al. . |
| 5,337,281 | 8/1994 | Kobayashi et al. . |
| 5,355,347 | 10/1994 | Cioaca . |
| 5,373,466 | 12/1994 | Landeta et al. . |
| 5,388,248 | 2/1995 | Robinson et al. ........................ 395/425 |
| 5,410,511 | 4/1995 | Michiyama . |
| 5,414,664 | 5/1995 | Lin et al. . |
| 5,428,755 | 6/1995 | Imai et al. . |
| 5,479,638 | 12/1995 | Assar et al. ........................ 395/430 |
| 5,485,595 | 1/1996 | Assar et al. ........................ 395/430 |
| 5,509,134 | 4/1996 | Fandrich et al. . |
| 5,528,758 | 6/1996 | Yeh . |
| 5,530,673 | 6/1996 | Tobita et al. . |
| 5,530,828 | 6/1996 | Kaki et al. . |
| 5,544,103 | 8/1996 | Lambertson . |
| 5,561,628 | 10/1996 | Terada et al. ........................ 365/185.04 |
| 5,572,466 | 11/1996 | Sukegawa . |
| 5,581,503 | 12/1996 | Matsubara et al. . |
| 5,581,723 | 12/1996 | Hasbun et al. . |
| 5,596,530 | 1/1997 | Lin et al. . |
| 5,603,001 | 2/1997 | Sukegawa et al. . |
| 5,603,056 | 2/1997 | Totani . |
| 5,631,745 | 5/1997 | Wong et al. . |
| 5,640,349 | 6/1997 | Kakinuma et al. . |
| 5,644,539 | 7/1997 | Yamagami et al. . |
| 5,668,957 | 9/1997 | Davis et al. . |
| 5,682,497 | 10/1997 | Robinson . |
| 5,719,808 | 2/1998 | Harari et al. ........................ 365/185.33 |
| 5,745,418 | 4/1998 | Ma et al. ........................ 365/185.33 |
| 5,793,774 | 8/1998 | Usui et al. ........................ 371/21.2 |
| 5,809,515 | 9/1998 | Kaki et al. ........................ 711/103 |
| 5,835,935 | 11/1998 | Estakhri et al. ........................ 711/103 |
| 5,841,699 | 11/1998 | Miyauchi ........................ 365/185.33 |
| 5,845,313 | 12/1998 | Estakhri et al. ........................ 711/103 |
| 5,883,842 | 3/1999 | Miyauchi ........................ 365/200 |

*Primary Examiner*—Thomas C. Lee
*Assistant Examiner*—Chun Cao
*Attorney, Agent, or Firm*—Robert E. Bushnell, Esq.

[57] ABSTRACT

A memory device with a small computer system interface reads and writes mass data at high speed. The memory device includes a plurality of flash memories and a control circuit for allowing the flash memories to write and read data by page and to erase the data by block.

52 Claims, 8 Drawing Sheets

MEMORY DEVICE HAVING PLURALITY OF FLASH MEMORIES WITH A FLASH MEMORY CONTROLLING CIRCUIT

CLAIM OF PRIORITY

This application makes reference to, incorporates the same herein, and claims all benefits accruing under 35 U.S.C. §119 from an application for MEMORY DEVICE WITH SMALL COMPUTER SYSTEM INTERFACE earlier filed in the Korean Industrial Property Office on the 10th of April 1997 and there duly assigned Serial No. 13196/1997.

BACKGROUND OF THE INVENTION

1. Technical Field

The present invention relates to a high-capacity auxiliary memory and, in particular, to a memory device with a small computer system interface (SCSI).

2. Related Art

A common electronic private branch exchange (PBX) system uses a hard disk as a memory device for storing a program and a database. Such a hard disk is independently connected to the exchange system, and serves as an auxiliary memory device for providing the exchange system with the necessary program and database. Specifically, the hard disk is connected to a main module of the exchange system via a small computer system interface (hereinafter referred to as SCSI).

In the case where the exchange system uses a mechanically-driven memory device (i.e., a hard disk is used as the high-capacity auxiliary memory device), it takes a long time to read and write data. Further, reliability of data reading and writing operations becomes lower and the life span of the hard disk becomes shorter.

The following patents are considered to be representative of the prior art, and are burdened by the disadvantages set forth herein: U.S. Pat. No. 5,682,497 to Robinson, entitled *Managing File Structures For A Flash Memory File System In A Computer*, U.S. Pat. No. 5,644,539 to Yamagami et al., entitled *Storage Device Employing A Flash memory*, U.S. Pat. No. 5,668,957 to Davis et al., entitled *Method And Apparatus For Providing Virtual DMA Capability On An Adapter Connected To A Computer System BUS With No DMA Support*, U.S. Pat. No. 5,640,349 to Kakinuma et al., entitled *Flash Memory System*, U.S. Pat. No. 5,631,745 to Wong et al., entitled *Multi-Function Telecommunications Instrument*, U.S. Pat. No. 5,603,056 to Totani, entitled *Disk Drive Control Computer And Method For Rewriting Control Program In Flash EEPROM With Serial Communication Using Unassigned Pins Of SCSI Or ATA Connector*, U.S. Pat. No. 5,603,001 to Sukegawa et al., entitled *Semiconductor Disk System Having Plurality Of Flash Memories*, U.S. Pat. No. 5,581,723 to Hasbun et al., entitled *Method And Apparatus For Retaining Flash Block Structure Data During Erase Operations In A Flash EEPROM Memory Array*, U.S. Pat. No. 5,581,503 to Matsubara et al., entitled *Data Line Disturbance Free Memory Block Divided Flash Memory And Microcomputer Having Flash Memory Therein*, U.S. Pat. No. 5,572,466 to Sukegawa, entitled *Flash Memory Chips*, U.S. Pat. No. 5,530,828 to Khaki et al., entitled *Semiconductor Storage Device Including A Controller For Continuously Writing Data To And Erasing Data From A Plurality Of Flash Memories*, U.S. Pat. No. 5,528,758 to Yeh, entitled *Method And Apparatus For Providing A Portable Computer With Integrated Circuit (IC) Memory Card Storage In Custom And Standard Formats*, U.S. Pat. No. 5,199,033 to McGeoch et al., entitled *Solid State Memory Array Using Address Block Bit Substitution To Compensate For Non-Functional Storage Cells*, U.S. Pat. No. 5,509,134 to Fandrich et al., entitled *Method And Apparatus For Execution Of Operations In A Flash Memory Array*, U.S. Pat. No. 5,530,673 to Tobita et al., entitled *Flash Memory Control Method And Information Processing System Therewith*, U.S. Pat. No. 5,428,755 to Imai et al., entitled *Method For Automatically Modifying Program In A Flash Memory Of A Magnetic Tape Unit*, U.S. Pat. No. 5,046,086 to Bergen et al., entitled *Page-Mapped Multi-Line Telephone Communication Systems*, U.S. Pat. No. 5,191,556 to Radjy, entitled *Method Of Page-Mode Programming Flash EEPROM Cell Arrays*, U.S. Pat. No. 4,979,171 to Ashley, entitled *Announcement And Tone Code Generator For Telephonic Network And Method*, U.S. Pat. No. 5,373,466 to Landeta et al., entitled *Flash-Clear of RAM Array Using Partial Reset Mechanism*, U.S. Pat. No. 5,410,511 to Michiyama, entitled *Method of Controlling the Erasing and Writing of Information in Flash Memory*, U.S. Pat. No. 5,280,454 to Tanaka et al., entitled *Electrically Erasable Programmable Read-Only Memory with Block-Erase Function*, U.S. Pat. No. 5,337,281 to Kobayashi et al., entitled *Non-Volatitle Semiconductor Memory Device in Which Data can be Erased on a Block Basis and Method of Erasing Data on a Block Basis in Non-Volatile Semiconductor Memory Device*, U.S. Pat. No. 5,414,664 to Lin et al., entitled *Flash EPROM with Block Erase Flags for Over-Erase Protection*, U.S. Pat. No. 5,596,530 to Lin et al., entitled *Flash EPROM with Block Erase Flags for Over-Erase Protection*, U.S. Pat. No. 5,544,103 to Lambertson, entitled *Compact Page-Erasable EEPROM Non-Volatile Memory*, and U.S. Pat. No. 5,355,347 to Cioaca, entitled *Single Transistor per EEPROM Memory Device with bit Line Sector Page Programming*.

SUMMARY OF THE INVENTION

It is, therefore, an object of the present invention to provide a memory device with a small computer system interface, capable of reading and writing mass data at high speed.

To achieve the above object, the memory device replaces the hard disk with flash memories. The memory device includes a control circuit for allowing the flash memories to write and read data by page, and to erase the data by block.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of the present invention will be described in detail hereinbelow with reference to the accompanying drawings. For comprehensive understanding of the present invention, the present invention will be illustratively described, confined to the specific embodiment. However, it should be noted that the present invention can be implemented by anyone skilled in the art with the description, not the details. In the following description, well-known functions or constructions which may obscure the present invention in unnecessary detail are not described in detail.

Figure 1:
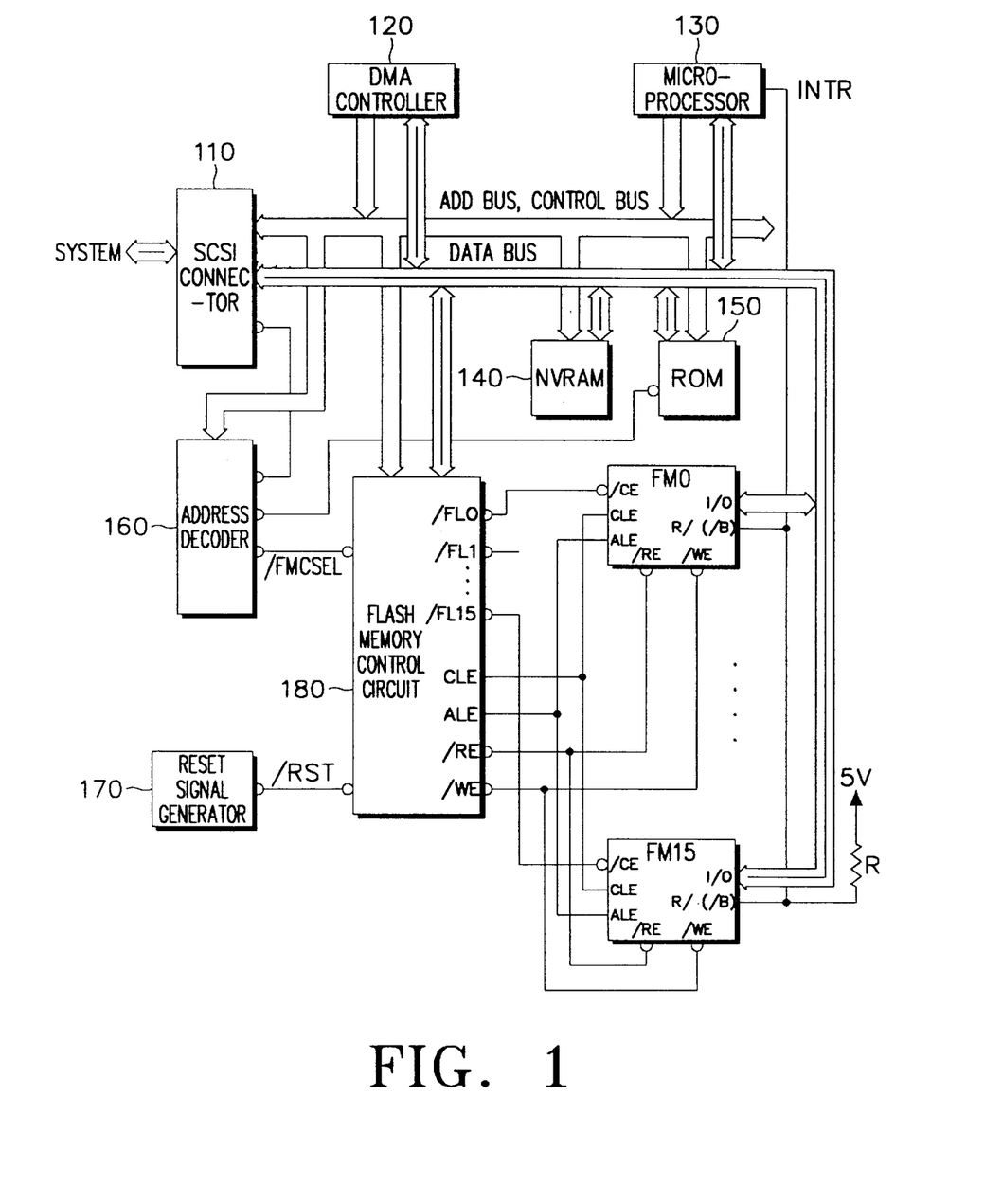
FIG. 1 is a block diagram of a memory device according to an embodiment of the present invention.

Referring to FIG. 1, a memory device according to an embodiment of the present invention includes a SCSI connector 110, a direct memory access (DMA) controller 120, a microprocessor 130, a non-volatile RAM (Random Access Memory) 140, a ROM (Read Only Memory) 150, an address decoder 160, a reset signal generator 170, a flash memory control circuit 180, and flash memories FM0–FM15.

The SCSI connector 110 connects the memory device according to the present invention to a private branch exchange (PBX) system which provides mass data. The DMA controller 120 controls the flash memory control circuit 180, and allows data access and transmission between the SCSI connector 110 and the flash memories FM0–FM15. The microprocessor 130 is connected to every element of the memory device according to the invention via an address bus, a data bus and a control bus, and controls overall operation of the elements. Further, the microprocessor 130 is provided with an interrupt signal INTR from the flash memories FM0–FM15. The non-volatile RAM 140 stores the data received from the SCSI connector 110 and delivers the stored data to the flash memories FM0–FM15 under the control of the DRAM controller 120 and the microprocessor 130. Alternatively, the non-volatile RAM 140 stores the data read from the flash memories FM0–FM15 and delivers the data stored therein to the SCSI connector 110. The ROM 150 stores a program of the microprocessor 130 for controlling overall operation of the memory device according to the invention, and is provided with a decoded signal from the address decoder 160. The address decoder 160 decodes an address signal received through the address bus and transmits the decoded output signals to the SCSI connector 110, the ROM 150 and the flash memory control circuit 180. In response to a flash memory control circuit selection signal/FMCSEL from the address decoder 160, the flash memory control circuit 180 operates to write data provided through the data bus into the flash memories FM0–FM15 or to read out the data stored in the flash memories according to the address signal provided through the address bus. The reset signal generator 170 generates a reset signal/RST for resetting the flash memory control circuit 180. Herein, unlike a general memory, the flash memories FM0–FM15 write and read the data by page, and erase the data by block, so that the memories are capable of storing the mass data at high speed.

In this embodiment, it is assumed that one page is composed of 512 bytes, one block is composed of 8 Kbytes, and the memory device has 16 4-Mbyte flash memories FM0–FM15. The respective memories FM0–FM15 are provided with a chip enable signal/CE, a write enable signal/WE, a read enable signal/RE, a command latch enable signal CLE, and an address latch enable signal ALE from the flash memory control circuit 180. The respective flash memories FM0–FM15 receive and output the data from and to the data bus by way of an input/output port I/O thereof. Further, each of the flash memories FM0–FM15 generates a ready/busy signal R/(/B) indicating that the flash memory is in a ready or busy state. As illustrated, signal terminals R/(/B) of the respective flash memories FM0–FM15 are coupled in common to a 5V source through a resistor R, so that the ready/busy signals R/(/B) are pulled up before being supplied to the microprocessor 130 as the interrupt signal INTR. The flash memory control circuit 180 has the construction shown in FIG. 2.

Figure 2:
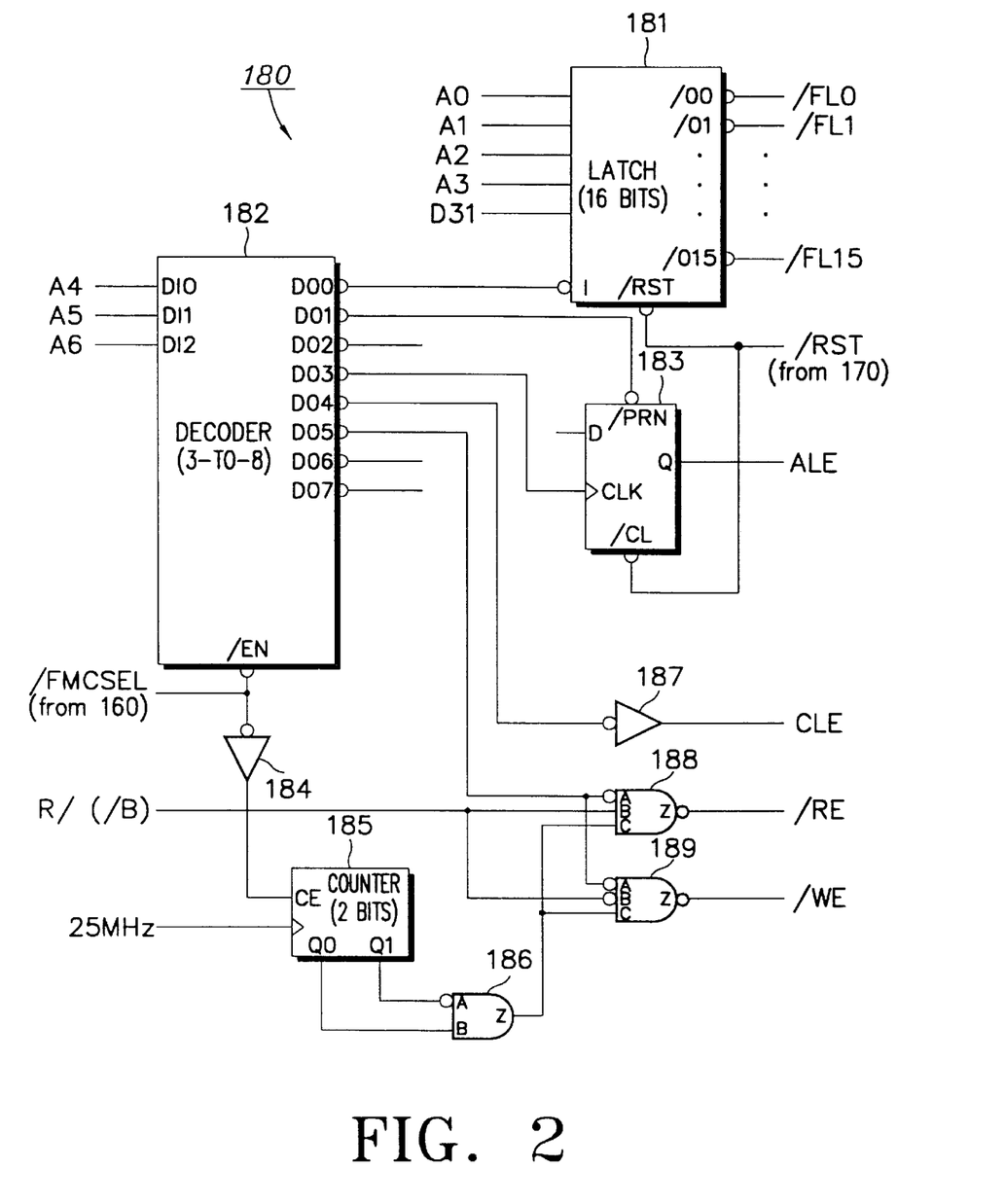
FIG. 2 is a detailed circuit diagram of the flash memory control circuit shown in FIG. 1.

Referring to FIG. 2, the flash memory control circuit 180 includes a latch 181, a decoder 182, a flip-flop 183, inverters 184 and 187, a counter 185, an AND gate 186, and NAND gates 188 and 189. The latch 181 latches address signals A0–A3 and a data signal D31 in response to an output signal DO0 of the decoder 182, and outputs 16 data bits/FL0–/FL15 through output terminals/O0/O15 thereof. Further, the latch 181 is reset in response to the reset signal/RST being provided from the reset signal generator 170 through a reset terminal/RST thereof. The decoder 182, being a 3-to-8 decoder, decodes address signals A4–A6 received at input terminals DI0–DI2 and outputs the decoded signals through output terminals DO0–DO7. The decoder 182 is enabled in response to the flash memory control circuit selection signal/FMCSEL provided by the address decoder 160 (FIG. 1) through an enable terminal/EN thereof. An output signal DO0 of the decoder 182 is applied to a terminal I of the latch 181, an output signal DO1 is applied to a preset terminal/PRN of the flip-flop 183, and an output signal D3 is applied to a clock terminal CLK of the flip-flop 182. Further, an output signal DO4 of the decoder 182 is applied to an input end of the inverter 187, and an output signal DO5 is applied to respective input ends A of the NAND gates 188 and 189. The flip-flop 183 outputs the address latch enable signal ALE at an output terminal Q thereof according to the output signal DO3 of the decoder 182. The flip-flip 183 is preset in response to the output signal DO1 provided by the decoder 182 through the preset terminal/PRN, and is cleared in response to the reset signal/RST provided by the reset signal generator 170 through a clear terminal/CL thereof.

The inverter 184 inverts the flash memory control circuit selection signal/FMCSEL from the address decoder 160, and the counter 185 is enabled in response to the output signal of the inverter 184. Specifically, upon receiving the output signal of the inverter 184 through a count enable terminal CE, the counter 185 begins to count a clock signal of 25 MHz provided by the microprocessor 130 and outputs a count value through output terminals Q0 and Q1 thereof. Having input ends A and B connected to the output terminals Q1 and Q0, respectively, of the counter 185, the AND gate 186 ANDs the output signals of the counter 185. The inverter 187 inverts the output signal DO4 of the decoder 182 to generate the command latch enable signal CLE. The NAND gate 188 NANDs the output signal DO5 of the decoder 182, the ready/busy signal R/(/B), and an output signal of the AND gate 186 to generate the read enable signal/RE. The NAND gate 189 NANDs the output signal DO5 of the decoder 182, the inverted ready/busy signal R/(/B), and an output signal of the AND gate 186 to generate the write enable signal/WE.

The chip enable signal/CE (/FL15), the write enable signal/WE, the read enable signal/RE, the command latch enable signal CLE, and the address latch enable signal ALE generated from the above described flash memory control circuit 180 are applied to the flash memories FM0–FM15.

Referring back to FIG. 1, a connection between the memory device according to the present invention and the exchange system is made by way of the SCSI connector 110. If the system transmits data to be stored to the memory device, the data received from the system is delivered to the non-volatile RAM 140 via the SCSI connector 110 under the control of the DAM controller 120. The data delivered to the non-volatile RAM 140 is stored in the flash memories FM0–FM15 according to the signals generated from the flash memory control circuit 180.

Conversely, the data stored in the flash memories FM0–FM15 are read out according to the signals generated by the flash memory control circuit 180, and are delivered to the non-volatile RAM 140. The data delivered is transferred to the system via SCSI connector 110 under the control of the DMA controller 102.

The flash memory control circuit 180 performing such operation is controlled by the microprocessor 130 and the MDA controller 120. The following Table 1 illustrates an address map of the flash memory control circuit 180.

TABLE 1

| ADDRESS | CONTENTS |
| --- | --- |
| FBASE0 – FBASE + 15 | /FL0–/FL15 |
| FBASE + 16 | Change ALE Signal to '1' |
| FBASE + 32 | Maintain ALE Signal to '1' |
| FBASE + 48 | Change ALE Signal to '0' |
| FBASE + 64 | Command Latch Cycle (CLE) |
| FBASE + 80 | Data Write, Data Read |

In Table 1, FBASE represents a base address where the flash memory control circuit 180 can be selected, and the flash memory control circuit 180 writes, reads and erases the data to and from the flash memories FM0–FM15 by accessing the ports corresponding to the address to make various signals.

Each of the flash memories FM0–FM15 includes pins for the chip enable signal/CE, the write enable signal/WE, the read enable signal/RE, the command latch enable signal CLE and the address latch enable signal ALE, as well as a chip R/(/B) for the ready/busy signal, an 8-bit input/output pin I/O serving as a data path for the address data, various command data, and actual input/output data. The ready/busy signals R/(/B) generated by the flash memories FM0–FM15 are pulled up and applied to the microprocessor 130 as the interrupt signal INTR.

Figure 3:
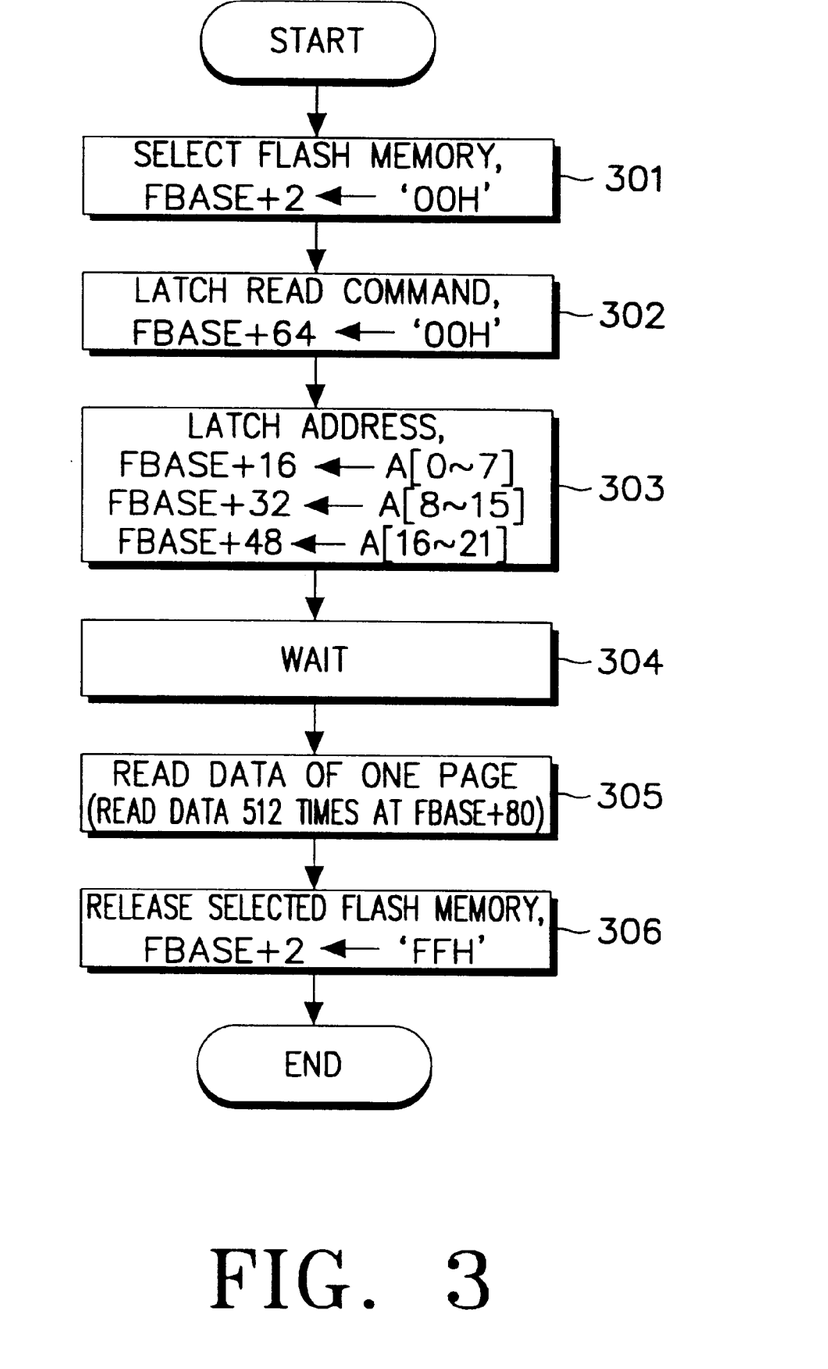
FIG. 3 is a flow chart of the memory device in a page read mode according to an embodiment of the present invention.
Figure 4:
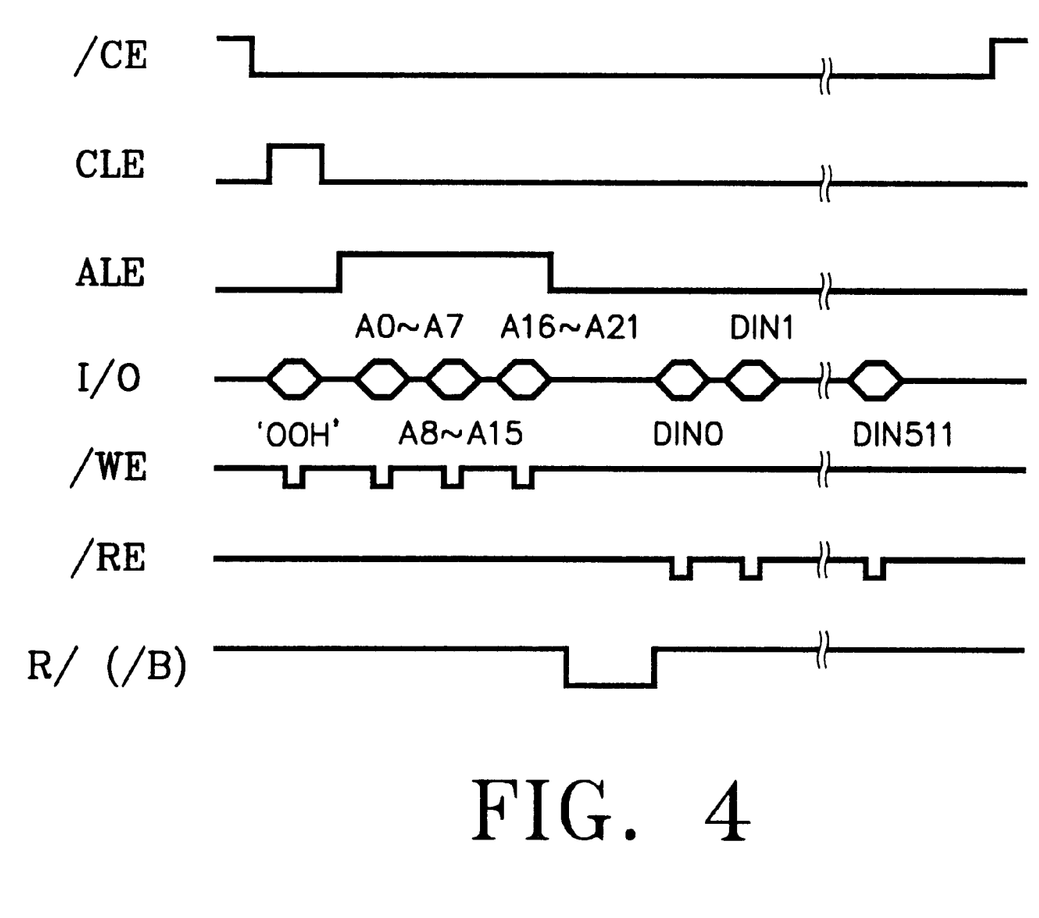
FIG. 4 is a timing diagram for the page read mode of the memory device according to the present invention.
Figure 5:
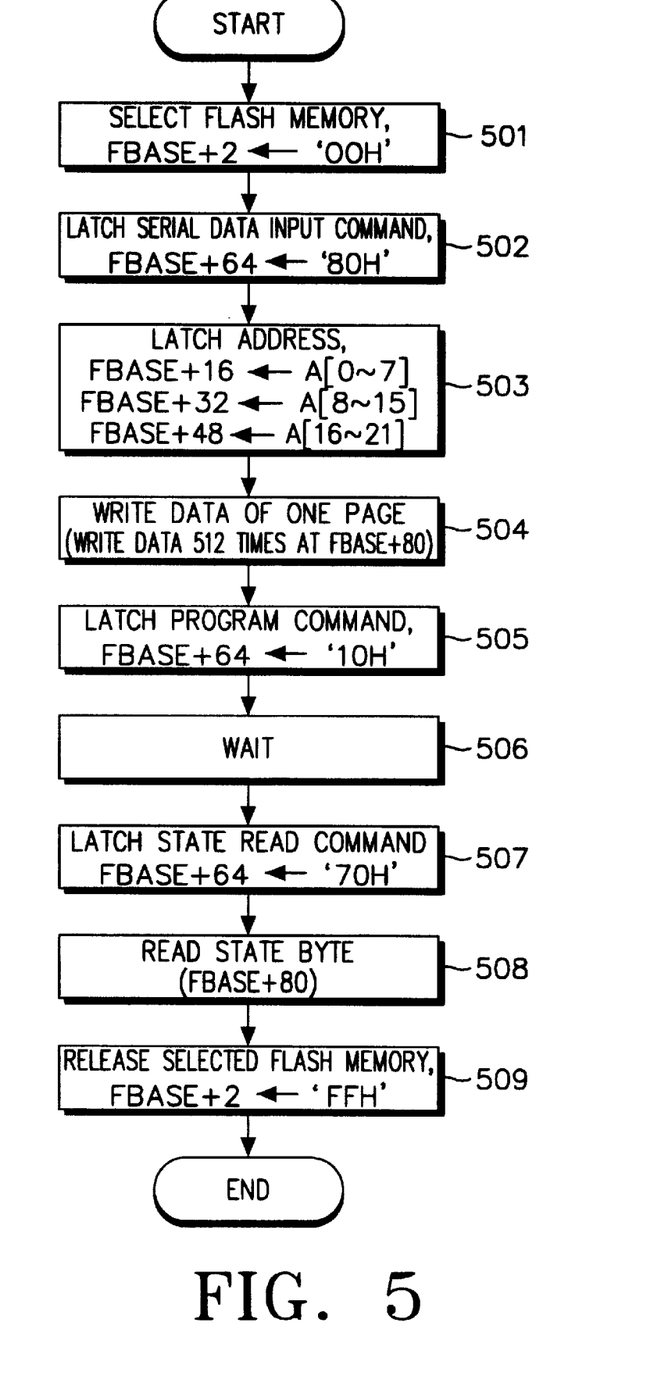
FIG. 5 is a flow chart of the memory device in a page write mode according to an embodiment of the present invention.
Figure 6:
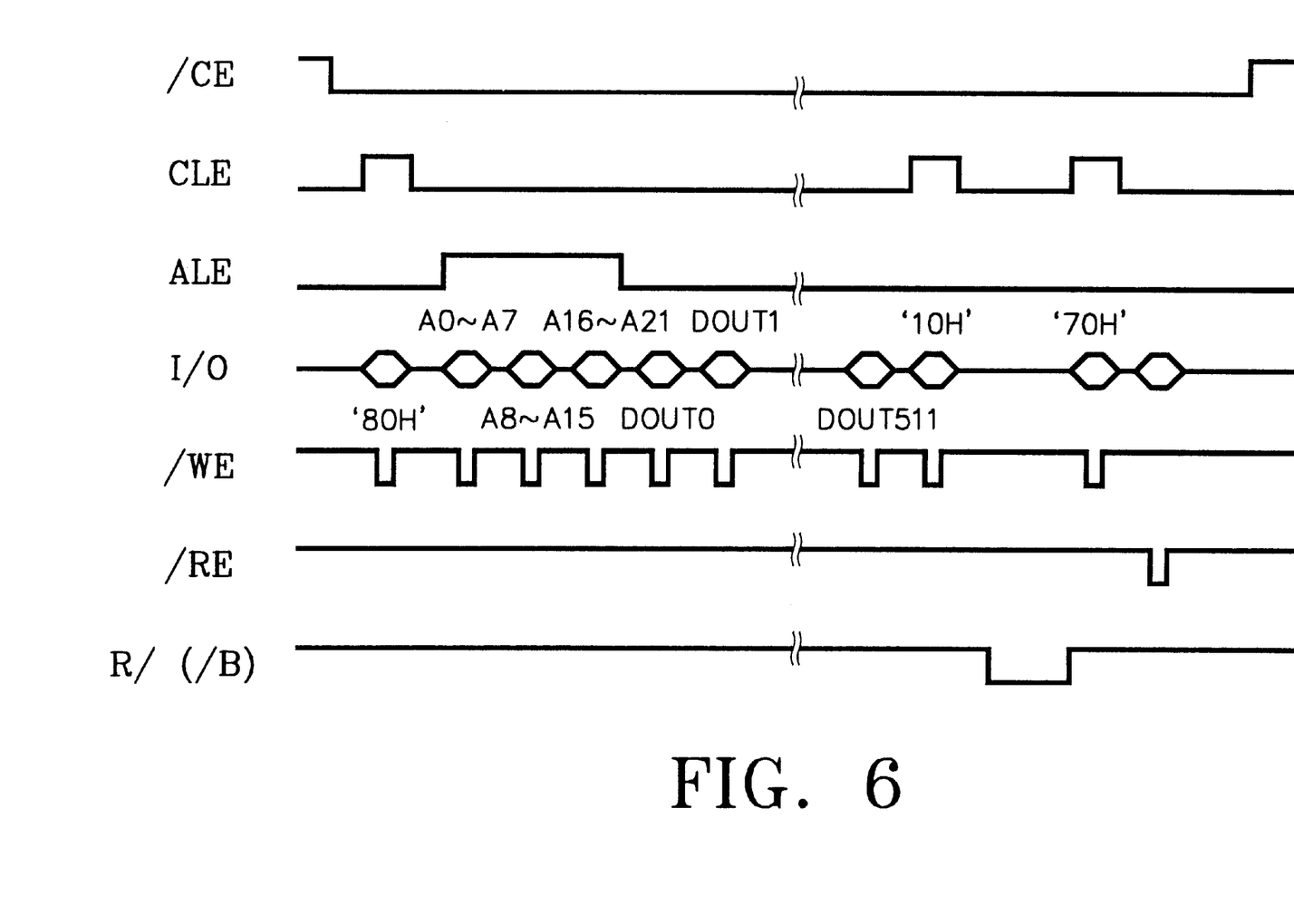
FIG. 6 is a timing diagram for the page write mode of the memory device according to the present invention.

The flash memories FM0–FM15 perform a page read mode according to the control flow shown in FIG. 3, and FIG. 4 is a timing diagram for the flash memories in the page read mode. The flash memories FM0–FM15 perform a page write mode according to the control flow shown in FIG. 5, and FIG. 6 is a timing diagram for the flash memories in the page write mode. Further, the flash memories FM0–FM15 operate in a block erase mode according to the control flow shown in FIG. 7, and FIG. 8 is a timing diagram for the flash memories in the block erase mode.

Referring to FIGS. 3 and 4, in the page read mode, a flash memory is selected at step 301. For example, in the case of selecting the flash memory FM3, the base address FBASE+2 becomes '00H'. At step 302, a read command is latched by setting the base address FBASE+64 to '00H'. At step 303, the address is latched by setting the base address FBASE+16 to A[0–7], the base address FBASE+32 to A[8–15], and the base address FBASE+48 to A[16–21], respectively. At step 304, the procedure waits until the ready/busy signal R/(/B) is changed from '0' to '1', (i.e, until the microprocessor 130 detects the interrupt signal INTR). After the ready/busy signal R/(/B) is changed from '0' to '1', the data of one page (512 bytes) is read out from the selected flash memory FM3, at step 305, by using the DAM controller 120. Specifically, the data is read out 512 times at the base address FBASE+80 by using the DMA controller 120. After reading the data, the selected flash memory FM3 is released at step 306 by setting the base address FBASE+2 to 'FFH'.

Referring to FIGS. 5 and 6, in the page write mode, a flash memory is selected at step 501. For example, in the case of selecting the flash memory FM3, the base address FBASE+2 becomes '00H'. At step 502, a serial data input command is latched by setting the base address FBASE+64 to '80H'. At step 503, the address is latched by setting the base address FBASE+16 to A[0–7], the base address FBASE+32 to A[8–15], and the base address FBASE+48 to A[16–21], respectively. After step 503, the data of one page (512 bytes) is written into the selected flash memory FM3, at step 504, by using the DMA controller. Specifically, the data is written 512 times at the base address FBASE+80 by using the DMA controller 120. At step 505, a program command is latched by setting the base address FBASE+64 to '10H'. Then, at step 506, the procedure waits until the ready/busy signal R/(/B) is changed from '0' to '1', (i.e, until the microprocessor 130 detects the interrupt signal INTR). After the ready/busy signal R/(/B) is changed from '0' to '1', a state read command is latched by setting the base address FBASE+64 to '70H' at step 507, and a state byte is read by reading the data at the base address FBASE+80 at step 508. Here, if the least significant bit (LSB) is '0', it is determined that the write operation is normal, and otherwise, it is determined that the write operation is abnormal. After reading the state byte, the selected flash memory is released at step 509 by setting the base address FBASE+2 to 'FFH'.

Figure 7:
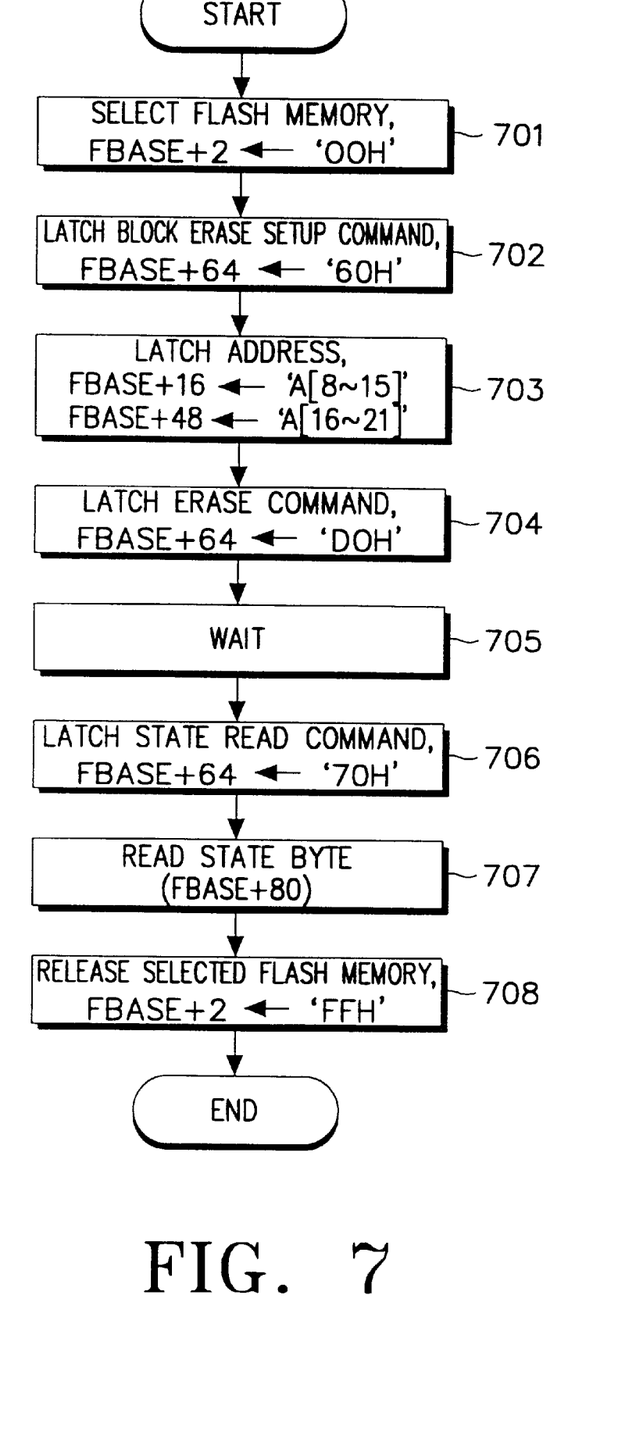
FIG. 7 is a flow chart of the memory device in a block erase mode according to an embodiment of the present invention.
Figure 8:
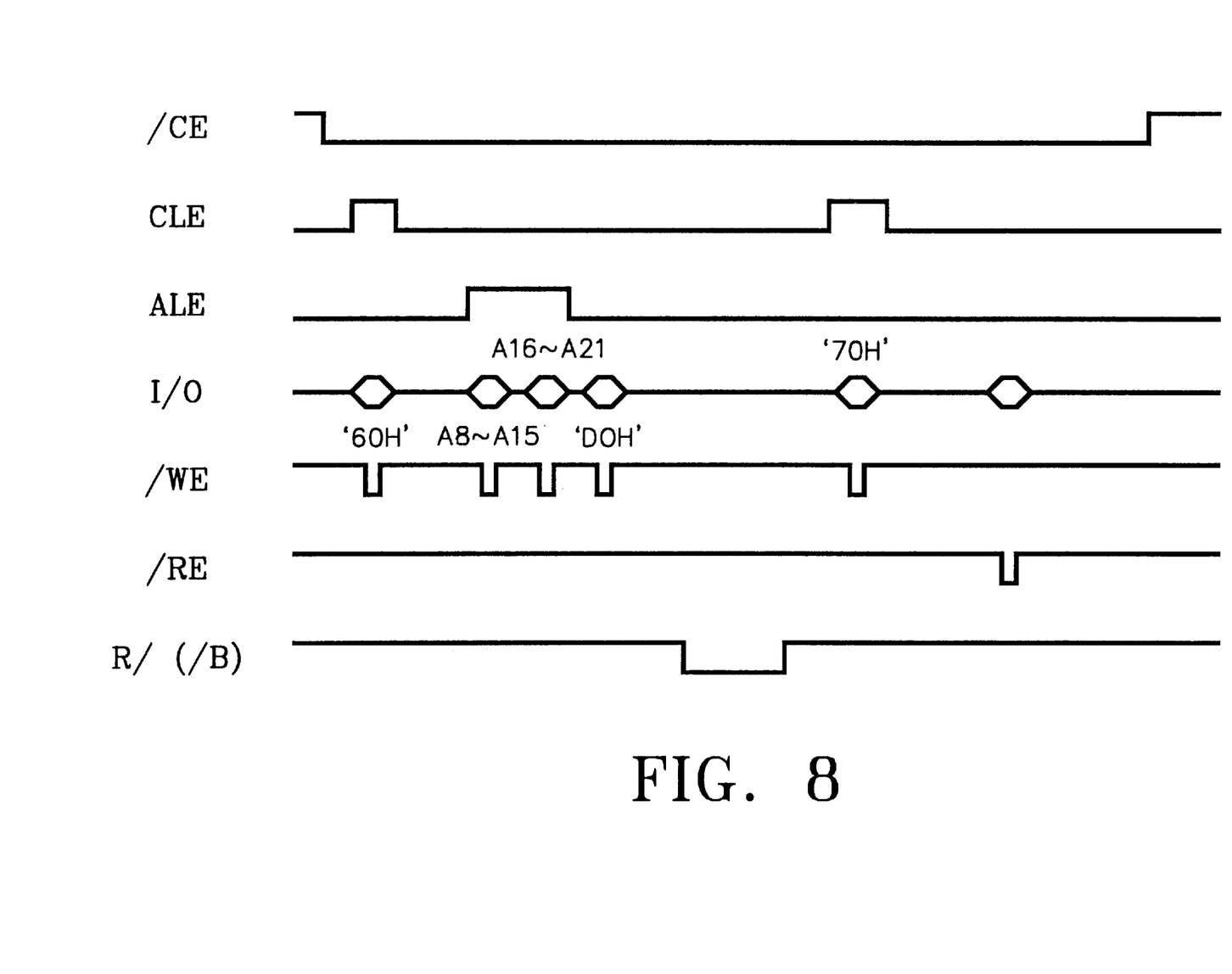
FIG. 8 is a timing diagram for the block erase mode of the memory device according to the present invention.

Referring to FIGS. 7 and 8, in the block erase mode, a flash memory is selected at step 701. For example, in the case of selecting the flash memory FM3, the base address FBASE+2 becomes '00H'. At step 702, a block erase setup command is latched by setting the base address FBASE+64 to '60H'. At step 703, the address is latched by setting the base address FBASE+16 to A[8–15] and the base address FBASE+48 to A[16–21], respectively. After the step 703, an erase command is latched at step 704 by setting the base address FBASE+64 to 'D0H'. At step 705, the procedure waits until the ready/busy signal R/(/B) is changed from '0' to '1', (i.e, until the microprocessor 130 detects the interrupt signal INTR). After the ready/busy signal R/(/B) is changed from '0' to '1', a state read command is latched at step 706 by setting the base address FBASE+64 to '70H', and the state byte is read at step 707 by reading the data at the base address FBASE+80. Here, if the least significant bit (LSB) is '0', it is determined that the erase operation is normal, and otherwise, it is determined that the erase operation is abnormal. After reading the state byte, the selected flash memory is released at step 708 by setting the base address FBASE+2 to 'FFH'.

As indicated in the foregoing description, the memory device of the invention uses flash memories, and can write and read data by page to and from the flash memories, and can erase data by block, by virtue of the flash memory control circuit.

As describe above, by replacing the hard disk, (which was conventionally used as an auxiliary memory device for the private branch exchange system), with flash memories, it is possible to provide a small and light auxiliary memory device. Further, by replacing the mechanical elements of the hard disk with electronic elements, the memory device has an enhanced reliability and a long life span. In particular, the memory device can reduce operating time.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A memory device for use in a system providing mass data, comprising:
   connector means including a small computer system interface (SCSI) for connecting said memory device to the system;
   a plurality of flash memories;
   direct memory access (DMA) controller means connected to said connector means via an address bus, a control bus and a data bus, and to said flash memories via said data bus, for controlling data access and transmission therebetween; and
   flash memory control circuit means connected to said data bus, said address bus said control bus and said flash memories for writing and reading data to and from the flash memories by page.

2. The memory device as claimed in claim 1, wherein said flash memory control circuit means erases the data in the flash memories by block.

3. The memory device as claimed in claim 1, further comprising memory means connected to said address bus, said control bus and said data bus, for temporarily storing the data transferred between the connector means and the flash memories.

4. The memory device as claimed in claim 3, wherein said memory means comprises a non-volatile random access memory.

5. The memory device as claimed in claim 3, wherein said memory means delivers the data to said flash memories under the control of said DMA controller means.

6. The memory device as claimed in claim 1, further comprising address decoder means connected to said address bus and said control bus, for decoding an address signal received through said address bus, and for transmitting decoded output signals to at least one of said connector means and said flash memory control circuit means.

7. The memory device as claimed in claim 6, wherein said flash memory control circuit means responds to a selection signal received from said address decoder means for writing data into the flash memories.

8. The memory device as claimed in claim 6, wherein said flash memory control circuit means responds to a selection signal received from said address decoder means for reading data stored in said flash memories.

9. The memory device as claimed in claim 6, wherein said flash memory control circuit means comprises a latch circuit for latching address signals and a data signal in response an output signal from said decoder means.

10. The memory device as claimed in claim 9, further comprising reset signal generator means for generating a reset signal, said latch circuit being reset in response to said reset signal.

11. The memory device as claimed in claim 6, wherein said flash memory control circuit means comprises a decoder for decoding address signals, and for outputting decoded signals, said decoder being enabled in response to a selection signal provided by said address decoder means.

12. The memory device as claimed in claim 11, said flash memory control circuit means further comprising a flip-flop connected to said decoder for receiving an output signal therefrom, said flip-flop having an output for providing an address latch enable signal.

13. The memory device as claimed in claim 12, wherein said flip-flop has a clock input connected to said decoder for receiving an output signal therefrom.

14. The memory device as claimed in claim 6, wherein said flash memory control circuit means further comprises a decoder circuit and an inverter connected thereto, said inverter being connected to said address decoder means for receiving and inverting a selection signal therefrom.

15. The memory device as claimed in claim 14, wherein said flash memory control circuit means further comprises a counter connected to an output of said inverter, said counter being enabled to perform a counting operation in response to an output signal from said inverter.

16. The memory device as claimed in claim 15, wherein said flash memory control circuit means further comprises output circuitry connected to an output of said counter for receiving a count value from said counter, and being responsive thereto for generating at least one of a read enable signal and a write enable signal.

17. The memory device as claimed in claim 16, wherein said output circuitry comprises an AND gate connected to the output of said counter and producing a first output, and a plurality of NAND gates connected to said AND gate and to said decoder circuit for generating said read enable signal and said write enable signal.

18. The memory device as claimed in claim 6, wherein said flash memory control circuit means comprises a decoder circuit producing an output signal, and an inverter circuit for receiving and inverting said output signal from said decoder circuit so as to generate a command latch enable signal.

19. A memory device for use in a system providing mass data, comprising:
   connector means including a small computer system interface (SCSI) for connecting said memory device to the system;
   a plurality of flash memories; and
   flash memory control circuit means connected to said connector means and to said plurality of flash memories for transferring data between said system and said flash memories;
   wherein said flash memory control circuit means comprises a decoder for decoding address signals, and for outputting decoded signals, said decoder being enabled in response to a selection signal provided by said address decoder means.

20. The memory device as claimed in claim 19, said flash memory control circuit means further comprising a flip-flop connected to said decoder for receiving an output signal therefrom, said flip-flop having an output for providing an address latch enable signal.

21. The memory device as claimed in claim 20, wherein said flip-flop has a clock input connected to said decoder for receiving an output signal therefrom.

22. A memory device for use in a system providing mass data, comprising:
   connector means including a small computer system interface (SCSI) for connecting said memory device to the system;

a plurality of flash memories;

flash memory control circuit means connected to said connector means and to said plurality of flash memories for transferring data between said system and said flash memories; and address decoder means connected to said connector means and to said flash memory control circuit means for decoding an address signal received through an address bus, and for transmitting decoded output signals to at least one of said connector means and said flash memory control circuit means;

wherein said flash memory control circuit means further comprises a decoder circuit and an inverter connected thereto, said inverter being connected to said address decoder means for receiving and inverting a selection signal therefrom.

23. The memory device as claimed in claim 22, wherein said flash memory control circuit means further comprises a counter connected to an output of said inverter, said counter being enabled to perform a counting operation in response to an output signal from said inverter.

24. The memory device as claimed in claim 23, wherein said flash memory control circuit means further comprises output circuitry connected to an output of said counter for receiving a count value from said counter, and being responsive thereto for generating at least one of a read enable signal and a write enable signal.

25. The memory device as claimed in claim 24, wherein said output circuitry comprises an AND gate connected to the output of said counter and producing a first output, and a plurality of NAND gates connected to said AND gate and to said decoder circuit for generating said read enable signal and said write enable signal.

26. A memory device for use in a system providing mass data, comprising:

connector means including a small computer system interface (SCSI) for connecting said memory device to the system;

a plurality of flash memories; and flash memory control circuit means connected to said connector means and to said plurality of flash memories for transferring data between said system and said flash memories;

wherein said flash memory control circuit means comprises a decoder circuit producing an output signal, and an inverter circuit for receiving and inverting said output signal from said decoder circuit so as to generate a command latch enable signal.

27. A method for auxiliary storage of mass data provided by a system via a small computer system interface (SCSI), comprising the steps of:

providing a plurality of flash memories for the auxiliary storage of the mass data;

selecting one of said flash memories, said selected one of said flash memories having a base address;

latching at least one address by incrementing the base address by a given value;

performing a desired data operation; and releasing one of the flash memories by setting the base address to a predetermined value.

28. The method as claimed in claim 27, further comprising the step, after the selecting step, of latching a read command.

29. The method as claimed in claim 27, wherein said performing step comprises reading data of one page.

30. The method as claimed in claim 27, further comprising the step, after the selecting step, of latching a serial data input command by incrementing the base address by a given value.

31. The method as claimed in claim 27, wherein said performing step comprises writing data of one page.

32. The method as claimed in claim 27, further comprising the step, after the selecting step, of latching a program command by incrementing the base address by a given value, and then waiting.

33. The method as claimed in claim 27, further comprising the step, after the performing step, of latching a state read command by incrementing the base address by a given value, and then reading a state byte.

34. The method as claimed in claim 27, further comprising the step, after the selecting step, of latching a block erase setup command by incrementing the base address by a given value.

35. The method as claimed in claim 27, further comprising the step, after the latching step, of latching an erase command by incrementing the base address by a given value, wherein said performing step comprises performing a data erase operation.

36. The method as claimed in claim 27, further comprising the step, after the latching step, of latching a state read command by incrementing the base address by a given value, and reading a state byte.

37. The memory device claimed in claim 1, wherein:

said flash memory control circuit means selects one of said flash memories, said selected one of said flash memories having a base address;

at least one address is latched by incrementing the base address by a given value;

a desired data operation is performed; and one of the flash memories is released by setting the base address to a predetermined value.

38. The memory device as claimed in claim 37, wherein a read command is latched after said one of said flash memories is selected.

39. The memory device as claimed in claim 37, wherein said desired data operation comprises reading data of one page.

40. The memory device as claimed in claim 37, wherein a serial data input command is latched by incrementing the base address by a given value after said one of said flash memories is selected.

41. The memory device as claimed in claim 37, wherein said desired data operation comprises writing data of one page.

42. The memory device as claimed in claim 37, wherein a program command is latched by incrementing the base address by a given value, and then waiting, after said one of said flash memories is selected.

43. The memory device as claimed in claim 37, wherein a state read command is latched by incrementing the base address by a given value, and then reading a state byte, after said one of said flash memories is selected.

44. The memory device as claimed in claim 37, wherein a block erase setup command is latched by incrementing the base address by a given value after said at least one address is latched.

45. The memory device as claimed in claim 37, wherein an erase command is latched by incrementing the base address by a given value after said at least one address is latched, and wherein said desired data operation comprises a data erase operation.

46. The memory device as claimed in claim 37, wherein a state read command is latched by incrementing the base address by a given value, and reading a state byte, after said one of said flash memories is selected.

47. The method as claimed in claim 27, further comprising the steps, between the providing and selecting steps, of:
  providing a connector to provide a connection to the system via the SCSI;
  providing a direct memory access (DMA) controller connected to said connector via an address bus, a control bus and a data bus, and connected to said flash memories via said data bus for controlling data access and transmission therebetween; and
  providing a flash memory control circuit connected to said data bus, said address bus, said control bus and said flash memories for writing and reading data to and from the flash memories by page.

48. The method as claimed in claim 47, further comprising the step of providing a memory connected to said address bus, said control bus and said data bus for temporarily storing the data transferred between the connector and the flash memories.

49. The method as claimed in claim 47, further comprising the step of providing an address decoder connected to said address bus and to said control bus for decoding an address signal received through said address bus, and for transmitting decoded output signals to at least one of said connector and said flash memory control circuit.

50. The method as claimed in claim 49, wherein said flash memory control circuit comprises a decoder for decoding address signals, and for outputting decoded signals, said decoder being enabled in response to a selection signal provided by said address decoder.

51. The method as claimed in claim 50, said flash memory control circuit further comprising a flip-flop connected to said decoder for receiving an output signal therefrom, said flip-flop having an output for providing an address latch enable signal.

52. The method as claimed in claim 51, wherein said flip-flop has a clock input connected to said decoder for receiving an output signal therefrom.

* * * * *